Patented Oct. 23, 1923.

1,471,469

UNITED STATES PATENT OFFICE.

EMANUEL KARDOS, OF NEWARK, NEW JERSEY.

METHOD OF DETINNING TIN SCRAP AND THE LIKE.

No Drawing.   Application filed April 14, 1920.   Serial No. 373,957.

*To all whom it may concern:*

Be it known that I, EMANUEL KARDOS, a citizen of Hungary, and resident of Newark, in the county of Essex and State of New Jersey, have invented a certain new and useful Method of Detinning Tin Scrap and the like, of which the following is a specification.

The invention relates to a method of detinning tin scrap and the like in order to recover the tin and the high grade iron used in the manufacture of tin plate. Heretofore, various electrolytic and chemical processes have been proposed for this purpose, but all former methods have been either expensive, rendering the cost of recovery inordinately high, or have been ineffective to produce a complete recovery of the tin. The object of the present invention is to provide a method which is at once economical and efficient of application, and which also insures the complete removal and recovery of the tin and the iron without material impairment of either of these elements.

To these ends the invention comprises the immersion of the tin scrap in an alkaline electrolyte, such, for example, as an aqueous solution of caustic soda or potash, in which the tin scrap serves as the positive electrode, the negative electrode being constituted by a suitable material, such as carbon, graphite, manganese dioxide or the like, and both of the electrodes being arranged in close proximity to each other and preferably in direct contact, and in adding to the materials immersed in the electrolyte, a suitable oxidizing agent, which also acts as a depolarizer, such, for example, as air, saltpeter, or the like. For example, excellent results have been obtained by employing an electrolyte solution containing from four per cent to twelve per cent of caustic soda, and from three per cent to ten per cent of saltpeter. The primary effect of the oxidizing and depolarizing agent, when intimately associated with the electrodes, and preferably in surface contact therewith, is to materially increase the potential that corresponds to the normal couple represented by the tin scrap and the more electro-negative material immersed in the electrolyte, and therefore to accelerate the thorough and complete removal of the tin from the scrap. The maintenance of a relatively high potential between the electrodes may also be effected by increasing the surface of the negative electrode exposed to the electrolyte, more especially when the negative electrode is carbon, graphite, manganese dioxide or the like.

In the preferred application of the method aforesaid, the tin scrap, constituting the positive electrode, is placed in baskets of a more electro-negative material, or in conveyors of such material, which affords a relatively large surface exposure, and is immersed within a tank or vat containing an electrolyte of the character described, to which an oxidizing agent, such as air, saltpeter, or the like, has been added.

The electro-negative material may either be mixed with the tin scrap, or may constitute an outer or inner lining of the basket, conveyor, or the like, or may be applied in any other suitable manner in connection with the basket or conveyor provided the materials are arranged and disposed in close proximity to each other.

What I claim is:

1. The method of detinning tin scrap which comprises subjecting the scrap as anode to the action of an alkaline bath in the presence of a material electro-negative to the tin associated with an oxidizing agent.

2. The method of detinning tin scrap which comprises immersing the scrap as anode and electrode of material electro-negative to the tin in an alkaline bath and supplying to the bath an oxidizing agent.

3. The method of detinning tin scrap which comprises placing the scrap as anode in a container consisting of a material electro-negative to the tin, immersing the container in an alkaline bath and supplying to the bath an oxidizing agent.

4. The method of detinning tin scrap which comprises placing the scrap as anode in a container consisting of a material electro-negative to the tin, immersing the container in an alkaline bath and supplying to the bath an oxidizing agent, and maintaining the electrodes in close contact with one another.

Signed at Chrome in the county of Middlesex and State of New Jersey this 7th day of April A. D. 1920.

EMANUEL KARDOS.